United States Patent
Uchiyama

[11] Patent Number: 5,829,855
[45] Date of Patent: Nov. 3, 1998

[54] PROJECTION-TYPE DISPLAY APPARATUS

[75] Inventor: Takayuki Uchiyama, Tokyo, Japan

[73] Assignee: Nikon Corporation, Tokyo, Japan

[21] Appl. No.: 803,748

[22] Filed: Feb. 21, 1997

[30] Foreign Application Priority Data

Feb. 21, 1996 [JP] Japan .................................. 8-033452
Feb. 22, 1996 [JP] Japan .................................. 8-034726

[51] Int. Cl.⁶ .............................................. G03B 21/14
[52] U.S. Cl. ............................. 353/74; 353/97; 353/122; 353/85
[58] Field of Search ................................ 353/74, 75, 77, 353/78, 85, 87, 119, 72, 73, 97; 359/460; 348/836, 841, 843, 794, 787, 842

[56] References Cited

U.S. PATENT DOCUMENTS

| | | | |
|---|---|---|---|
| 4,135,784 | 1/1979 | Larrick | 359/460 |
| 5,289,287 | 2/1994 | Dargis et al. | 353/71 |
| 5,363,149 | 11/1994 | Furuno et al. | 353/72 |
| 5,491,585 | 2/1996 | Dolgoff | 353/78 |
| 5,512,968 | 4/1996 | Hagiwara et al. | 353/72 |

FOREIGN PATENT DOCUMENTS

| | | |
|---|---|---|
| 4-429A | 1/1992 | Japan . |
| 4-54779A | 2/1992 | Japan . |
| 4-250437A | 9/1992 | Japan . |

*Primary Examiner*—William Dowling
*Attorney, Agent, or Firm*—Oliff & Berridge, PLC

[57] ABSTRACT

A projection-type display apparatus has a casing enclosing a light source and a projection optical system for projecting an image onto a picture screen when a power source is turned on and includes an opening, a door, a locking device and a temperature detector. A door is associated with the casing and the opening and moves between a closed condition to cover the opening and an open condition to provide access into the casing. The locking device is associated with the door and the casing and operate to lock and unlock the door. The temperature detector detects a temperature of the light source or a vicinity proximate the light source and is operably connected to the locking device. When the detected temperature exceeds a predetermined temperature, the locking device retains the door in the locked state and when the detected temperature is equal to or less than the predetermined temperature, the locking device unlocks the door. Another embodiment of the projection-type display apparatus includes a rectangular conversion member, a photometry device and a display device.

32 Claims, 4 Drawing Sheets

PROJECTION-TYPE DISPLAY APPARATUS

BACKGROUND OF THE INVENTION

1. Field of the Invention

The present invention relates to a projection-type display apparatus which displays a video image through an enlarged projection of a video image light onto a picture screen.

2. Description of Related Art

In a projection-type display apparatus, high performance, high resolution space light modulation devices (liquid crystal panels) have been developed in order to reduce weight and size, and various products to which this kind of display apparatus has been applied, regardless of rear projection type or front projection type, have been commercialized. When a space light modulation device is used in place of a projection tube, a light source is necessary in order to illuminate the device with an illuminating light. As a light source, a xenon lamp, halogen lamp, metal halide lamp or the like are generally used. This type of light source gradually loses intensity with time, and consequently, the light source must be replaced, with the useful life considered to be the time needed for the total light rays from the light source to reach 70% of its initial value.

With the conventional projection-type display apparatus described above, a light source has been necessary in cases where a space light modulation device was used. As the light source, a halogen lamp or metal halide lamp or the like are generally used. The useful life of this kind of light source is approximately 1,000 to 1,500 hours, and because this is relatively short in comparison with conventional picture tubes, the problem arises in that replacement of light sources must be accomplished.

While it is possible to prevent electric shock accidents during replacement by turning the light source switch off, countermeasures to burns when replacing the light source, which is very hot, have not been adequately addressed. Also, there are no displays to assist a user for replacing the light source. Even if there were displays, the display would most likely turn off when the power source switch is turned off. Thus, it becomes impossible to determine whether the light source is in a replaceable state i.e. sufficiently cool so that the user can grasp the light source.

In addition, because the performance of the light source decreases gradually, it is difficult to comprehend the amount of decrease from the original performance. Further, when the projection-type display apparatus is used without recognizing that the performance has decreased, abrupt inoperability of the light source can occur.

In consideration of the foregoing, it is an object of the present invention to provide a projection-type display apparatus which can display the useful life and state of the light source.

Furthermore, it is an object of the present invention to provide a projection-type display apparatus which can continue detecting the temperature of the light source or the vicinity of the light source even after the main power source has been turned off, and in which inadvertent replacement of the light source cannot be performed.

In order to achieve the above objects, the present invention is a projection-type display apparatus, of a type with a light source and a projection optical system which projects an image onto a screen provided in the casing thereof. A light source replacement window is provided in the casing and the window is covered by a door which is locked to the casing by a locking means. A temperature detection means which detects the temperature of the light source or in a vicinity of the light source are provided inside the casing and the temperature detection means releases a locked state of the locking means when the temperature of the light source is not greater than a predetermined temperature so that the door can be opened to gain access to the light source.

In addition, the present invention is such that an auxiliary power source is provided which supplies power to the temperature detection means and causes temperature detection to continue when the main power source is turned off.

In addition, the present invention is such that display means are provided which displays whether the light source is in a replaceable state.

In addition, the present invention is a projection-type display apparatus of the type with a light source and an optical system which projects an image onto a screen provided in the casing. A rectangular conversion member which blocks a portion of the light source light and converts the unblocked portion of light to rectangular light rays. A photometry means which measures the intensity of the light rays which have been blocked by the rectangular conversion member and display means which warns against or prompts replacement of the light source through a signal from the photometry means are provided in the casing.

In addition, the present invention is such that the photometry means are provided in the light-blocking portion of the rectangular conversion member.

In addition, the present invention is such that the display means which are used to prompt or warn against replacement of the light source display an image by writing to a space light modulation device.

Furthermore, the present invention is such that the display means which are used to prompt or warn against replacement of the light source are a light-emitting device.

In the present invention, the temperature detection means detects and measures the temperature of the light source. The display means displays whether the light source is in a replaceable state through a signal from the temperature detection means. The locking means lock the door used for access to the light source for replacement and maintain the status in which the light source cannot be replaced when the light source is at least as hot as a predetermined temperature. On the other hand, the locked state is released so that replacement is possible when the temperature is not greater than the predetermined temperature.

The auxiliary light source supplies electricity to the temperature detection means when the main power source is turned off.

The photometry means measures the intensity of the light source light and the display means displays a warning or prompt to replace the light source on the basis of this measurement. In addition, the display means displays an image by writing to a space light modulation device.

SUMMARY OF THE INVENTION

Accordingly, a projection-type display apparatus is hereinafter described. The projection-type display apparatus has a casing that encloses a light source and a projection optical system that projects an image onto a picture screen when a main power source is turned on. One embodiment of the projection-type display apparatus includes an opening, a door, locking means and temperature detection means. The opening is formed into the casing and is sized so that the light source can be replaced by a user. The door is associated with the casing and the opening. The door is movable between a closed condition in which the door covers the opening to block access into the casing and an opened condition in which the door is positioned away from the opening to provide access into the casing.

The locking means is associated with the door and the casing. The locking means is operative to move between a locked state to lock the door in the closed condition and a release state to unlock the door in the closed condition to allow the door to move to the opened condition. The temperature detection means is disposed adjacent the light source for detecting a temperature of either the light source or a vicinity proximate the light source. The temperature detection means is operably connected to the locking means so that, when the detected temperature exceeds a predetermined temperature, the locking means retains the door in the locked state, and when the detected temperature is equal to or less than the predetermined temperature, the locking means moves to the release state. The predetermined temperature is a temperature sufficient to permit a user to grasp the light source without injury.

The projection-type display apparatus of the present invention also includes an auxiliary power source which is operative to provide power to at least the temperature detection means when the main power source is turned off.

Another embodiment of the projection-type display apparatus of the present invention includes a rectangular conversion member, photometry means and display means. The rectangular conversion member is disposed on an optical axis between the light source and the projection optical system. The rectangular conversion member has a rectangular opening formed therethrough and is operative to block a peripheral portion of the light rays emitted from the light source and permit a remaining portion of the light rays to pass therethrough to the projection optical system.

The photometry means measures an intensity of the peripheral portion of the blocked light rays and the display means is operable in connection with the photometry means for providing information to a user about the light source. The information is provided to the user as either a warning to the user against replacing the light source or a prompting to the user to replace the light source. The display means displays the information on a space light modulation device. It is preferred that the display means is a light-emitting device.

The photometry means are connected to a light-blocking portion of the rectangular conversion member.

Another embodiment of the present invention is a rear projection-type display apparatus that includes a casing. The casing has at least a front panel manner and encloses the light source and the projection optical system therein. The front panel member has an opening formed therein and is sized to releasably receive the picture screen so that, when the picture screen is moved away from the opening, the light source, positioned within the casing closer to the opening relative to the projection optical system, is more accessible to a user than the projection optical system. Preferably, the picture screen is pivotally connected to the casing and the light source is positioned adjacent the opening.

Another embodiment of the present invention is a rear projection-type display apparatus that includes a casing and a door. The casing has a projection screen and a front panel member and encloses the light source and the projection optical system therein. The front panel member has an opening formed therein and is sized so that the light source can be replaced by a user whereby the light source within the casing is disposed closer to the opening relative to the projection optical system.

The door is associated with the casing and the opening and is movable between a closed condition and an opened condition. In the closed condition, the door covers the opening to block access into the casing and in the opened condition the door is positioned away from the opening to provide access into the casing for replacing the light source.

DETAILED DESCRIPTION OF PREFERRED EMBODIMENTS

Hereafter, the present invention will be described in detail with reference to embodiments thereof shown in the attached drawings.

Figure 1:
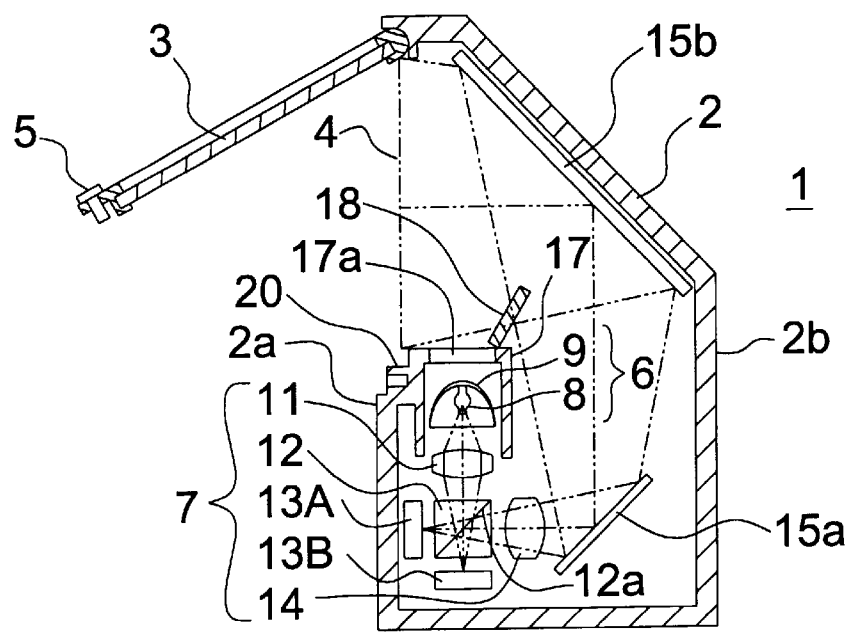
FIG. 1 is a cross-sectional view showing a first embodiment of a rear projection-type display apparatus of the present invention.

FIG. 1 is a cross-sectional view of a first embodiment of a rear projection-type display apparatus according to the present invention. In this figure, the rear projection-type apparatus 1 is provided with a box-like casing 2 and a movable picture screen 3. An opening 4 is provided in a top of a front panel 2a of the casing 2, and the opening 4 is normally covered by the picture screen 3. The picture screen 3 is such that a top edge is mounted on the opening 4 of the casing 2 so as to be free to pivot, and a bottom edge is normally anchored to the casing 2 by means of an anchoring member 5 such as a screw or the like. When this kind of picture screen is opened, it is possible to observe the below-described various components which are housed inside the casing 2, and, in addition, replacement of the light source is possible.

Inside the casing 2, a light source unit 6 and a optical system 7 are used in order to enlarge and project video image light onto the picture screen 3. The light source unit 6 is comprised of a light source 8, such as a halogen light bulb, metal halide light bulb or the like, and a reflector 9 which reflects light from the light source 8. The optical system 7 comprises a relay lens 11 which forms the light emitted from the light source 8 into approximately parallel light; a polarizing beam splitter 12 which divides the light which has passed through the relay lens 11 into transmitted light and reflected light; two space light modulation devices 13A and 13B composed of reflective-type liquid crystal panels (twisted nematic-phonetic) liquid crystals which modulate the transmitted light and convert it into video image light; a projection lens 14 which projects the video image light modulated by these space light modulation devices 13A and 13B onto the rear surface of the screen 3; and reflective mirrors 15a and 15b.

Because the life span of the light source 8 is approximately 1,000 hours and is relatively short in comparison with a conventional projection tube, replacement of the light source is necessary even under normal use. When the light source 8 is replaced, if the light source is in a location deep inside the apparatus and is hidden by the internal components such as the optical system 7 or the like, it is necessary to move the rear projection-type display apparatus 1 into a position accessible to disassemble the internal components each time the light source requires replacement. In addition, the replacement of light sources in situations without the capability of directly seeing the light source cannot be conducted with care because there are components and parts that are hot, such as the light source 8 inside the casing 2. Consequently, the light source 8 is housed below a reflector 9 in a light source housing unit 17 provided in the casing 2, and is positioned above the optical system 7. The light source housing unit 17 is provided integrally with the inside surface of the front panel 2a of the casing 2 and is positioned above the relay lens 11 so that the light source 8 is positioned close to the opening 4. In addition, the light source housing unit 17 is formed in a tube shape, and a top surface opening 17a therein is normally covered by a cover 18 that is free to open and close, and, because of leakage of light from the light source, some of the light does not reach the picture screen 3.

The polarizing beam splitter 12 is provided below the relay lens 11. Behind the polarizing beam splitter 12 are a projection lens 14 and a reflective mirror 15a. Another reflective mirror 15b is provided on the inside top surface of the rear surface panel 2b of the casing 2. The inside top surface of the rear surface panel 2b where the reflective mirror 15b is attached is formed of an inclined surface which slopes downwardly at an angle necessary in order to enable projection of the video image light onto the picture screen 3.

In the rear projection-type display apparatus 1 of the first embodiment of the present invention, light from the light source 8 is natural light having the properties of circularly polarized light which, after passing through the relay lens 11, is incident on the polarizing beam splitter 12. The polarizing beam splitter 12 divides the light from the light source 8 into reflected linearly polarized light (S polarized light) and transmitted linearly polarized light (P polarized light) through a dielectric multi-layer membrane 12a. The S polarized light is reflected at a right angle to the optical axis of the natural light and is incident on one of the reflective-type space light modulation devices 13A. The P polarized light passes through the polarizing beam splitter 12 without change and is incident on the other reflective-type space light modulation device 13B. When voltage is selectively supplied to the reflective-type space light modulation devices 13A, 13B in accordance with the composition pixels of the image to be projected, the P polarized light and the S polarized light become video image light by the polarizing direction rotating partially in accordance with the image. In this case, the S polarized light incident on the reflective-type space light modulation device 13A passes through the beam splitter and becomes the video image light of P polarized light and is re-incident on the polarizing beam splitter 12. On the other hand, the P polarized light incident on the reflective-type space light modulation device 13B becomes the video image light of S polarized light, is re-incident on the polarizing beam splitter 12 and is reflected, and through this is composed with the P polarized light re-incident on the polarizing beam splitter 12 which has been reflected by the reflective-type space light modulation device 13A. Furthermore, the composed video image light is projected onto the rear surface of the screen 3 via the projection lens 14 and the reflective mirrors 15a, 15b, so that a color image is formed.

In the present embodiment, an example was shown wherein a color image is displayed by mixing two colors (for example, magenta video image light and green video image light) using one polarizing beam splitter 2 and two reflective-type space light modulation devices 13A, 13B as the optical system 7. However, this is intended to be illustrative and not limiting, for it would also be appropriate to use transmissive-type space light modulation devices, or to use three reflective-type or transmissive-type space light modulation devices and a polarizing beam splitter 12, or to use a projection optical system such that a display is made through chromatic mixing of the three primary colors of red, blue and green.

In the rear projection-type display apparatus 1 having the above components, the picture screen 3 and cover 18 open as shown in FIG. 1. During replacement of the light source 8 and the light source unit 6, the picture screen 3 is drawn out toward the top of the light source housing unit 17 and, as a result, it is possible to make the replacement of the light source 8 easily. In addition, furniture or other obstacles normally are not placed in front of the picture screen 3. It is therefore not necessary to move the rear projection-type display apparatus 1 itself when replacing the light source 8.

In addition, because the light source 8 is positioned in the casing 2 near the opening 4 and is positioned above the optical system 7, it is not necessary to touch the optical system 7 or to disassemble the optical system 7. It is also possible to replace the light source in a natural posture while directly viewing the light source 8. Accordingly, special tools and techniques are not required, so that the user of the rear projection-type display apparatus 1 can make the replacement by himself/herself.

Furthermore, after the screen 3 has been moved and the light source 8 has been replaced, by anchoring the picture screen 3 to the casing 2 using the anchoring member 5, it is possible to return the apparatus to the previous state so that the image does not deteriorate. During the replacement, it is further possible to prevent fluctuations in the image by providing a guide 20 in the casing 2 so that the position of the picture screen 3 does not vary before and after the replacement of the light source 8, thereby increasing reliability. In addition, an anchoring arm (not shown) may also be provided so that the picture screen 3 does not inadvertently move during the replacement of the light source 8.

Figure 2:
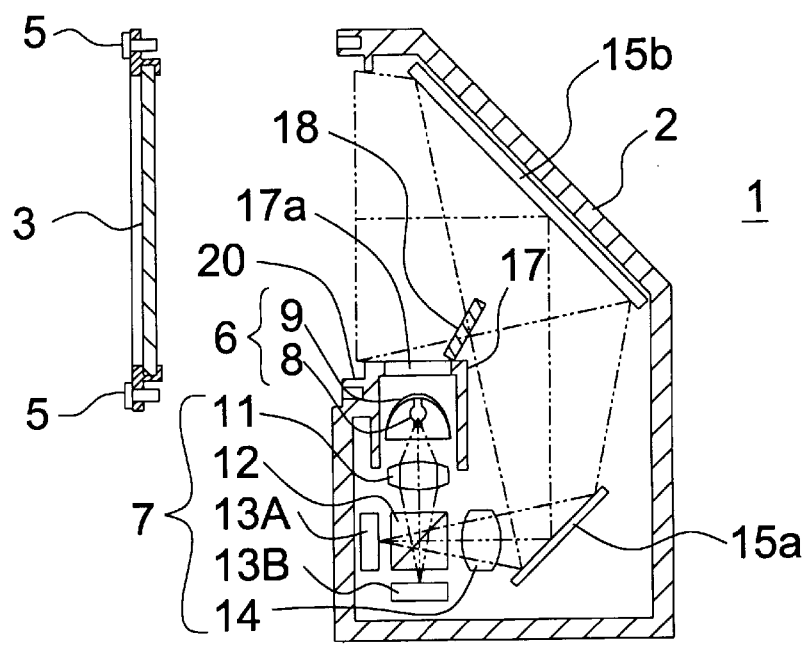
FIG. 2 is a cross-sectional view showing a second embodiment of a rear projection-type display apparatus of the present invention.

In the present embodiment, an example has been shown of a picture screen which is provided so as to be free to pivot with respect to the casing 2 as a movable picture screen 3. As shown in the second embodiment in FIG. 2, the picture screen may be provided so as to be removable and may be anchored by means of the anchoring means such as a screw or the like. The remainder of the components is the same as in the above-described first embodiment.

Figure 3:
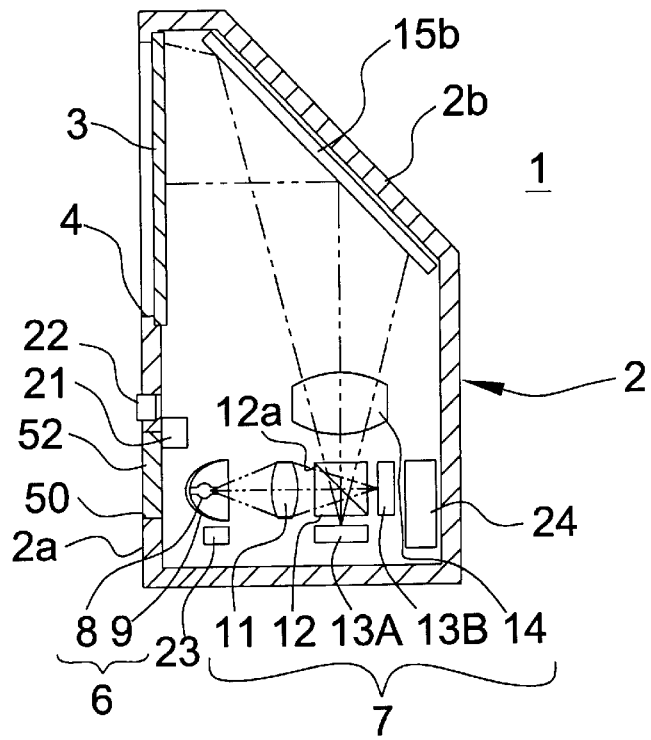
FIG. 3 is a cross-sectional view showing a third embodiment of a rear projection-type display apparatus of the present invention.

FIG. 3 is a cross-sectional view showing the shape of a third embodiment of a rear projection-type display apparatus of the present invention. In FIG. 3, the rear projection-type apparatus 1 is provided with the box-like casing 2 and the picture screen 3. The opening 4 is provided in the top of the front panel 2a of the casing 2, and the opening 4 is normally covered by the picture screen 3. By way of example, a top edge of the picture screen 3 may be pivotally mounted to the casing 2 so as to be free to pivot by means of a hinge as described above, or the picture screen 3 can be directly and immovably connected to the front panel 2a.

A reflective mirror 15 is provided on the inside top of the casing 2. The rear surface panel 2b of the casing 2 to which the reflective mirror 15 is attached is formed as an inclined surface which slopes downwardly at an angle necessary to enable projection of the video image light onto the picture screen 3. The light source unit 6 and projection optical system 7 are arranged from front to back relative to the front surface panel 2a on an inside bottom of the casing 2, and a light source replacement window or opening 50 is provided in the bottom of the front surface panel 2a of the casing 2 opposite the light source unit 6, with the light source replacement window 50 normally covered by a light source replacement door 52.

Furthermore, a locking means 21 which normally locks the door 52, and a display means 22 such as an LED or the like which displays the locked state of the door 20 regardless if replacement of the light source 8 is needed are provided in the front surface panel 2a. A temperature detection means 23 composed of a thermistor bimetal or the like and which is used to detect the temperature of the light source 8 or a vicinity proximate the light source, and an auxiliary power source 24 are disposed inside the casing 2. Although not by way of limitation, the temperature detection means 23 are disposed near the bottom of the light source 8, and when the detection means detects that the temperature of the light source 8 or the vicinity proximate the light source has fallen below a predetermined temperature, the display means 22 illuminate and, at the same time, the locked state of the door 20 by the locking means 21 is released thereby unlocking the door 52. Thus, the apparatus achieves a state in which replacement of the light source 8 is possible. The auxiliary power source 24 is configured with circuitry such that temperature surveillance of the light source 8 or its vicinity by the temperature detection means 23 continues to be accomplished even when the main power source of the apparatus is turned off. In addition, through the introduction of the auxiliary power source 24, the locking means 21 also functions so that the locked state of the door 52 can continue although the main power source is turned off.

In the rear projection-type display apparatus 1 having the above-described components, replacement of the light source 8 is accomplished by opening the door 52. In this case, if the locking means 21 of the door 52 is not provided, it is possible that the door 52 will be opened inadvertently at some time other than for replacement. However, in the present invention, the door 52 is normally locked by the locking means 21, so that this is not a concern. In addition, the display means 22 is illuminated and the locked state of the door 52 by the locking means 21 is released when it is detected by the temperature detection means 23 that the temperature of the light source 8 or the vicinity proximate the light source has dropped sufficiently to a predetermined temperature that is sufficiently low so the user can replace the light source without injury. Consequently, a hand of the user can be inserted into the casing 2 and touch a warm or cool light source 8 but not a hot light source, thereby avoiding injury. A sufficient drop in temperature of the light source 8 or the vicinity proximate the light source can differ depending on whether the components and parts which will be touched directly by the user's hand during the replacement are materials made of metal, composite resins, rubber or the like. The predetermined temperature for directly touching the components and parts of approximately 3° C. to 70° C. may be considered safe for touching.

In addition, the light source unit 6 is positioned in the front of the projection optical system 7 and is close to the light source replacement window 50. Consequently, the replacement operation for the light source unit 6 or the light source 8 itself can be accomplished easily without the projection optical system 7 and/or the other components impeding replacement.

In addition, because the present invention is provided with the auxiliary power source 24, the temperature detection means 23 continue to detect the temperature of the light source 8 or its vicinity even if the main power source is turned off, so that a display of whether replacement of the light source 8 is possible continues by the display means 22 and the locking means 21 continues to maintain the door 20 in its locked state. Accordingly, when the light source 8 or its vicinity is at a high temperature, it is impossible to open the door 52, thereby preventing careless replacement of the light source 8 even when the main power source is turned off.

Figure 4:
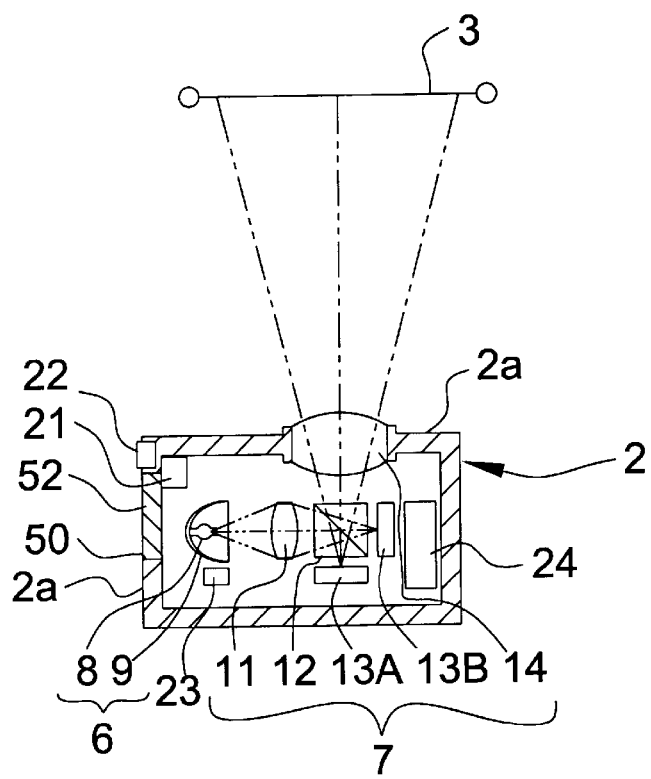
FIG. 4 is a cross-sectional view showing a fourth embodiment of a front projection-type display apparatus of the present invention.

FIG. 4 is a cross-sectional view showing a fourth embodiment of a front projection-type display apparatus of the present invention. The components which are the same as those shown in FIG. 3 are labeled with the same alphanumeric characters. In this embodiment, the projection lens 14 is connected to the front surface panel 2a of the casing 2 facing towards the outside, and the picture screen 3 is positioned in front of the casing 2 so as to face the projection lens 14. In this embodiment, the reflective mirror is unnecessary. The remainder of the components is the same as in the third embodiment shown in FIG. 3.

In this embodiment, the temperature detection means 23 continue to detect the temperature of the light source 8 as in the above-described embodiment, and electrical circuitry is such that locking means 21 do not unlock the door 52 until the temperature drops below a predetermined temperature. Consequently it is possible to prevent the operation of replacement the light source in high temperature states.

Figure 5:
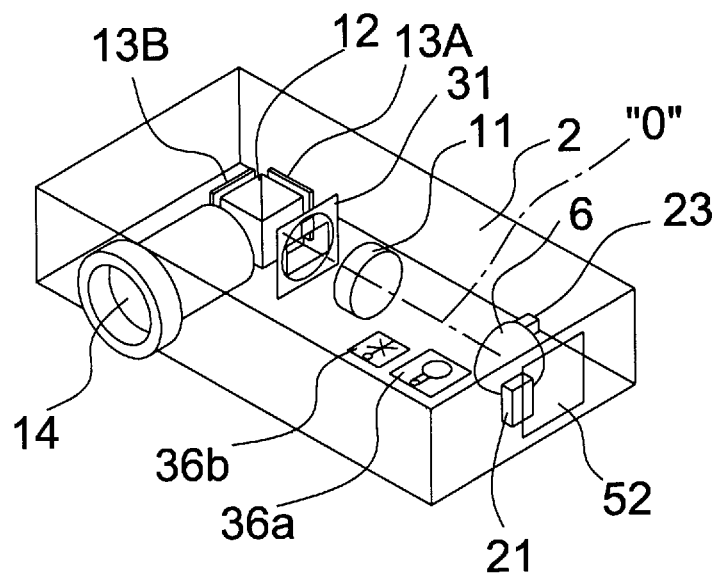
FIG. 5 is a perspective view showing a fifth embodiment of a front projection-type display apparatus of the present invention.
Figure 6:
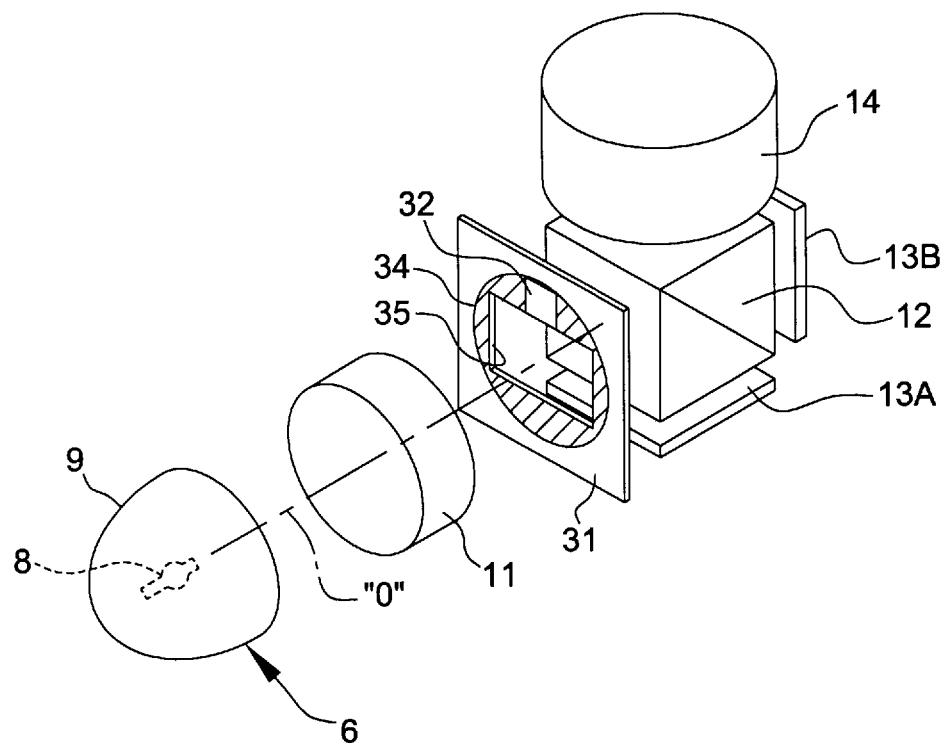
FIG. 6 is a perspective view showing the primary components of a light source unit and projection optical system.

FIG. 5 shows a perspective view of the fifth embodiment of a front projection-type display apparatus of the present invention. FIG. 6 is a perspective view showing the primary components of the light source unit and projection optical system. In the fifth embodiment and in addition to the above-described embodiments, a rectangular conversion member 31, which blocks a portion of the light rays 34 emitted from the light source 8 and converts the light rays into light rays having a rectangular cross-section, is positioned on the optical axis "0" between the relay lens 11 and the polarizing beam splitter 12. A photometry device 32, such as a photo diode or the like, is provided which measures the intensity of the light rays which are blocked by the rectangular conversion member 31. For this purpose, the rectangular conversion member 31 is provided with a rectangular opening 35 that allows a portion of the light rays to pass through while a portion of the rectangular conversion member 31 blocks a portion of the light rays from the light source 8. The photometry device 32 is anchored on the surface of the rectangular conversion member 31 facing the relay lens 11 in a position where light rays which are blocked (illustrated as a crosshatched area) by a portion of the rectangular conversion member 31 surrounding the rectangular opening 35. Furthermore, in an appropriate location on the top surface of the casing 2, two warning lights 36a, 36b are provided which indicate a time to replace the light source and whether replacement is possible. The warning light 36a illuminates and emits a warning when it is determined that the useful life of the light source 8 has substantially ended on the basis of the measurement results of the photometry device 32. The other warning light 36*b* illuminates when the temperature of the light source 8 drops to the predetermined temperature and the locking means 21 is released to the release state thereby unlocking the door 52.

In the front projection-type display apparatus of the fifth embodiment of the present invention, the light rays emitted from the light source 8 have a rounded cross-section and are converted into a rectangular cross-section by a portion of the light being blocked by the rectangular conversion unit 31. Consequently, the light rays which have been blocked do not reach the polarizing beam splitter 12 and do not contribute to the brightness of the projected image. The photometry device 32 measures the intensity of the light rays blocked by the rectangular conversion member 31, and, consequently, does not have any effect on the brightness of the projected image.

The luminosity of the light source 8 gradually decreases during use, so the brightness of the projected image also gradually decreases. When the intensity of the light rays emitted from the light source and blocked by the rectangular conversion member 31 is measured by the photometry device 32, it is possible to know the amount of decrease in the brightness of the projected image. If, for example, the life span of the light source is set as the time when the brightness has dropped to 70% of the initial brightness, it is possible for the user to know that the life of the light source 8 has ended by the warning light 36*a* being illuminated when the measurement results of the photometry device 32 are 70% of the initial brightness. However, there is also the concern that because the brightness will not reach 70% of the initial value when the light source 8 is initially turned on, the warning light 36*a* could illuminate following an erroneous determination that the life of the light source 8 has ended. Hence, in order to prevent this situation from arising, the photometry device 32 performs the life span determination after it is detected that the measured value is constant. The setting of the life of the light source 8 may also be pre-set without comparison with the initial value.

The warning light 36*a* is not required to illuminate a warning or to flash to indicate a warning. The warning light 36*a* can, for example, illuminate color changes so long as the warning can be understood.

In addition, with the present invention it is possible to know with certainty that replacement of the light source 8 is possible because the warning light 36*b* illuminates when the temperature of the light source 8 has dropped to the predetermined temperature and the locking means 21 is in a release state.

Figure 7:
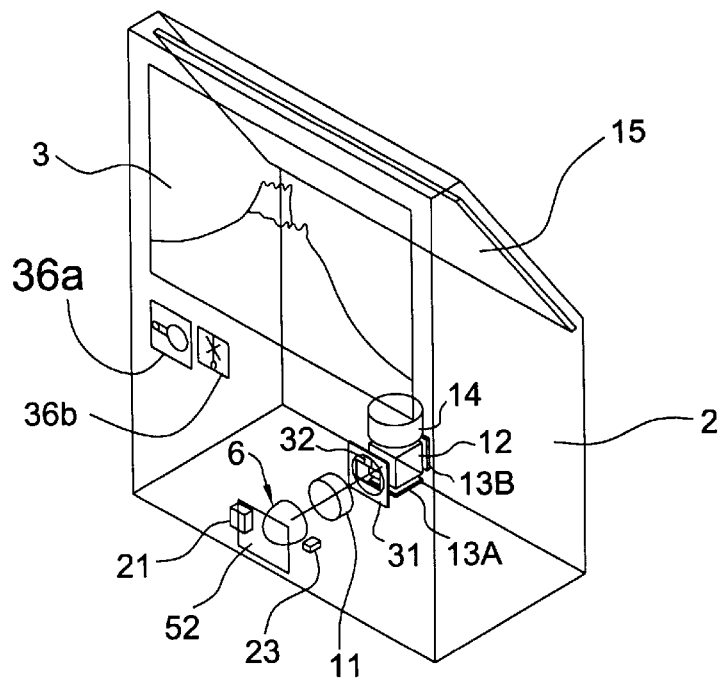
FIG. 7 is a perspective view showing a sixth embodiment of a rear projection-type display apparatus of the present invention.

FIG. 7 is a perspective view showing a sixth embodiment of a rear projection-type display apparatus of the present invention. In this embodiment, the two warning lights 36*a*, 36*b* are provided on the front panel of the casing 2 near the picture screen 3. The remainder of the components is the same as the third embodiment shown in FIGS. 5 and 6.

In this embodiment, the two warning lights 36*a*, 36*b* are provided near the picture screen 3. Consequently, when the projection display apparatus is viewed from the front, it is possible to readily recognize whether the lights 36*a*, 36*b* are illuminated, and it is possible to thereby improve one's awareness of the end of the useful life of the light source 8 and the status of its replacement.

Figure 8:
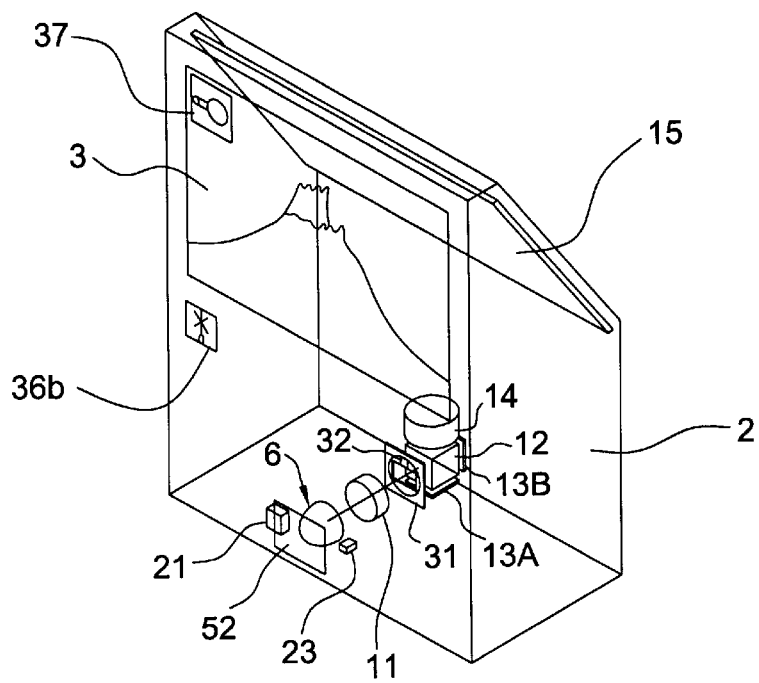
FIG. 8 is a perspective view showing a seventh embodiment of a rear projection-type display apparatus of the present invention.

FIG. 8 is a perspective view showing a seventh embodiment of a rear projection-type display apparatus of the present invention. In this embodiment, when it has been determined that the useful life of the light source 8 has ended through measurement of the intensity of the light rays by the photometry device 32 shown in FIG. 4, instead of warning lights illuminating, a warning display 37 is written on the space light modulation devices 13A, 13B, and is thereby directly displayed on the picture screen 3.

The remainder of the components is the same as the embodiments described above.

Also, in this embodiment, a warning display 37 is shown on the picture screen 3 when the useful life of the light source 8 has ended. Consequently, it is possible to further improve the user's awareness of the end of the useful life of the light source 8.

It would be appropriate to also use the warning display device 37 which flashes as a display. In addition, the warning display 37 may also be set so as to be erasable by the user as necessary, and may also be automatically erasable when a predetermined time has elapsed after the display starts.

One of ordinary skill in the art would appreciate that, as a result of the benefits of the present invention, it is impossible to open the door until the temperature of the light source or the vicinity proximate the light source has dropped below the predetermined temperature. Therefore, replacement of the light source is prevented when the light source or the vicinity proximate the light source is at a high temperature. Thus, the user cannot replace the light source until it is safe to do so. The display means displays an indicator to inform the user with certainty when replacement of the light source becomes possible. Also, the auxiliary power source provides power to the temperature detection means, the display means and the locking means when the main power source is turned off. Thus, all of the features of the present invention are operable without the main power source turned on. Also, the display means can display information to indicate to the user to change the light source because its useful life has deteriorated. The deterioration of the useful life of the light source is determined by photometry means.

The present invention has been described with particularity in connection with specific embodiments. It should be appreciated, however, that changes may be made to the disclosed embodiments without departing from the inventive concepts as defined by the following claims.

What is claimed is:

1. A projection-type display apparatus having a casing enclosing a light source and a projection optical system for projecting an image onto a picture screen, the projection-type display apparatus comprising:

an opening formed into the casing and sized so that the light source can be replaced by a user;

a door associated with the casing and the opening and movable between a closed condition whereby the door covers the opening to block access into the casing and an opened condition whereby the door is positioned away from the opening to provide access into the casing;

locking device associated with the door and the casing and operative to move between a locked state to lock the door in the closed condition and a release state to unlock the door in the closed condition thereby allowing the door to move to the opened condition; and temperature detection device disposed adjacent the light source for detecting a temperature of the light source or a vicinity proximate the light source and operably connected to the locking device so that, when the detected temperature exceeds a predetermined temperature, the locking device retains the door in the locked state and, when the detected temperature is one of equal to and less than the predetermined temperature, the locking device moves to the release state.

2. A projection-type display apparatus according to claim 1, further comprising an auxiliary power source operative to provide power to at least the temperature detection device when a main power source is turned off.

3. A projection-type display apparatus according to claim 1, wherein the predetermined temperature is a temperature sufficient to permit a user to grasp the light source without injury.

4. A projection-type display apparatus according to claim 3, further comprising display device for displaying an indicator to indicate to the user that the light source can be grasped.

5. A projection-type display apparatus according to claim 1, further comprising:

a rectangular conversion member disposed on an optical axis between the light source and the projection optical system and having a rectangular opening formed therethrough, the rectangular conversion member operative to block a peripheral portion of light rays emitted from the light source and permit a remaining portion of light rays to pass therethrough to the projection optical system;

photometry device for measuring an intensity of the peripheral portion of the blocked light rays; and display device operable in connection with the photometry device for providing information to a user about the light source.

6. A projection-type display apparatus according to claim 5, wherein the information provided to the user is one of warning the user against replacing the light source and prompting the user to replace the light source.

7. A projection-type display apparatus having a casing enclosing a light source and a projection optical system for projecting an image onto a picture screen, the projection-type display apparatus comprising:

a rectangular conversion member disposed on an optical axis between the light source and the projection optical system and having a rectangular opening formed therethrough, the rectangular conversion member operative to block a peripheral portion of light rays emitted from the light source and permit a remaining portion of light rays to pass therethrough to the projection optical system;

photometry device for measuring an intensity of the peripheral portion of the blocked light rays; and display device operable in connection with the photometry device for providing information to a user about the light source.

8. A projection-type display apparatus according to claim 7, wherein the information provided to the user is one of warning the user against replacing the light source and prompting the user to replace the light source.

9. A projection-type display apparatus according to claim 8, wherein the display device display the information on a space light modulation device.

10. A projection-type display apparatus according to claim 9, wherein the display device are a light-emitting device.

11. A projection-type display apparatus according to claim 7, wherein the photometry device are connected to a light-blocking portion of the rectangular conversion member.

12. A projection-type display apparatus according to claim 7, further comprising:

an opening formed into the casing and sized so that the light source can be replaced by a user; and a door associated with the casing and the opening and movable between a closed condition whereby the door covers the opening to block access into the casing and an opened condition whereby the door is positioned away from the opening to provide access into the casing.

13. A projection-type display apparatus according to claim 12, further comprising:

locking device associated with the door and the casing and operative to move between a locked state to lock the door in the closed condition and a release state to unlock the door in the closed condition thereby allowing the door to move to the opened condition.

14. A projection-type display apparatus according to claim 13, further comprising:

temperature detection device disposed adjacent the light source for detecting a temperature of the light source or a vicinity proximate the light source and operably connected to the locking device so that, when the detected temperature exceeds a predetermined temperature, the locking device retains the door in the locked state and, when the detected temperature is one of equal to and less than the predetermined temperature, the locking device moves to the release state.

15. A projection-type display apparatus according to claim 14, further comprising an auxiliary power source operative to provide power to the temperature detection device and the locking device when a main power source is turned off.

16. A rear projection-type display apparatus having a light source and a projection optical system for projecting an image onto a picture screen, the rear projection-type display apparatus comprising:

a casing having at least a front panel member and enclosing the light source and the projection optical system therein, the front panel member having an opening formed therein and sized to releasably receive the picture screen so that, when the picture screen is moved away from the opening, the light source positioned within the casing closer to the opening relative to the projection optical system is more accessible to a user than the projection optical system.

17. A rear projection-type display apparatus according to claim 16, wherein the picture screen is pivotally connected to the casing.

18. A rear projection-type display apparatus according to claim 16, wherein the light source is positioned adjacent the opening.

19. A rear projection-type display apparatus according to claim 16, wherein the opening is sized so that the user can replace the light source.

20. A rear projection-type display apparatus according to claim 16, further comprising light source temperature detection device.

21. A rear projection-type display apparatus according to claim 16, further comprising a rectangular conversion member disposed on an optical axis between the light source and the projection optical system and having a rectangular opening formed therethrough, the rectangular conversion member operative to block a peripheral portion of light rays emitted from the light source and permit a remaining central portion of light rays to pass therethrough to the projection optical system.

22. A rear projection-type display apparatus according to claim 16, further comprising:

an opening formed into the casing and sized so that the light source can be replaced by a user;

a door associated with the casing and the opening and movable between a closed condition whereby the door covers the opening to block access into the casing and an opened condition whereby the door is positioned away from the opening to provide access into the casing;

locking device associated with the door and the casing and operative to move between a locked state to lock the door in the closed condition and a release state to unlock the door in the closed condition thereby allowing the door to move to the opened condition; and temperature detection device disposed adjacent the light source for detecting a temperature of the light source or a vicinity proximate the light source and operably connected to the locking device so that, when the detected temperature exceeds a predetermined temperature, the locking device retains the door in the locked state and, when the detected temperature is one of equal to and less than the predetermined temperature, the locking device moves to the release state.

23. A rear projection-type display apparatus according to claim 22, further comprising an auxiliary power source operative to provide power to the temperature detection device and the locking device when a main power source is turned off.

24. A rear projection-type display apparatus having a light source and a projection optical system for projecting an image onto a picture screen, the rear projection-type display apparatus comprising:

a casing having a projection screen and a front panel member and enclosing the light source and the projection optical system therein, the front panel member having an opening formed therein and sized so that the light source can be replaced by a user whereby the light source within the casing is disposed closer to the opening relative to the projection optical system; and a door associated with the casing and the opening and movable between a closed condition whereby the door covers the opening to block access into the casing and an opened condition whereby the door is positioned away from the opening to provide access into the casing for replacing the light source.

25. A rear projection-type display apparatus according to claim 24, wherein the picture screen is pivotally connected to the casing.

26. A rear projection-type display apparatus according to claim 24, wherein the light source is positioned adjacent the opening.

27. A rear projection-type display apparatus according to claim 24, further comprising:

locking device associated with the door and the casing and operative to move between a locked state to lock the door in the closed condition and a release state to unlock the door in the closed condition thereby allowing the door to move to the opened condition; and temperature detection device disposed adjacent the light source for detecting a temperature of the light source or a vicinity proximate the light source and operably connected to the locking device so that, when the detected temperature exceeds a predetermined temperature, the locking device retain the door in the locked state and, when the detected temperature is one of equal to and less than the predetermined temperature, the locking device move to the release state.

28. A rear projection-type display apparatus according to claim 27, further comprising an auxiliary power source operative to provide power to at least the temperature detection device when a main power source is turned off.

29. A rear projection-type display apparatus according to claim 27, further comprising display device for displaying an indicator to indicate to the user that the light source can be grasped.

30. A rear projection-type display apparatus according to claim 27, further comprising a rectangular conversion member disposed on an optical axis between the light source and the projection optical system and having a rectangular opening formed therethrough, the rectangular conversion member operative to block a peripheral portion of light rays emitted from the light source and permit a remaining central portion of light rays to pass therethrough to the projection optical system.

31. A projection-type display apparatus having a casing enclosing a light source and a projection optical system for projecting an image onto a picture screen, the projection-type display apparatus comprising:

an opening formed into the casing and sized so that the light source can be replaced by a user;

a door associated with the casing and the opening and movable between a closed condition whereby the door covers the opening to block access into the casing and an opened condition whereby the door is positioned away from the opening to provide access into the casing;

a locking device associated with the door and the casing and operative to move between a locked state to lock the door in the closed condition and a release state to unlock the door in the closed condition thereby allowing the door to move to the opened condition;

a temperature detector disposed adjacent the light source for detecting a temperature of the light source or a vicinity proximate the light source and operably connected to the locking device so that, when the detected temperature exceeds a predetermined temperature, the locking device retains the door in the locked state and, when the detected temperature is one of equal to and less than the predetermined temperature, the locking device moves to the release state;

a rectangular conversion member disposed on an optical axis between the light source and the projection optical system and having a rectangular opening formed therethrough, the rectangular conversion member operative to block a peripheral portion of light rays emitted from the light source and permit a remaining portion of light rays to pass therethrough to the projection optical system;

a photometry device for measuring an intensity of the peripheral portion of the blocked light rays; and a display device operable in connection with the photometry device for providing information to a user about the light source.

32. A projection-type display apparatus according to claim 1, further comprising an auxiliary power source operative to provide power to at least the temperature detector, the locking device, the photometry device and the display device when a main power source is turned off.

* * * * *